Figure 1:
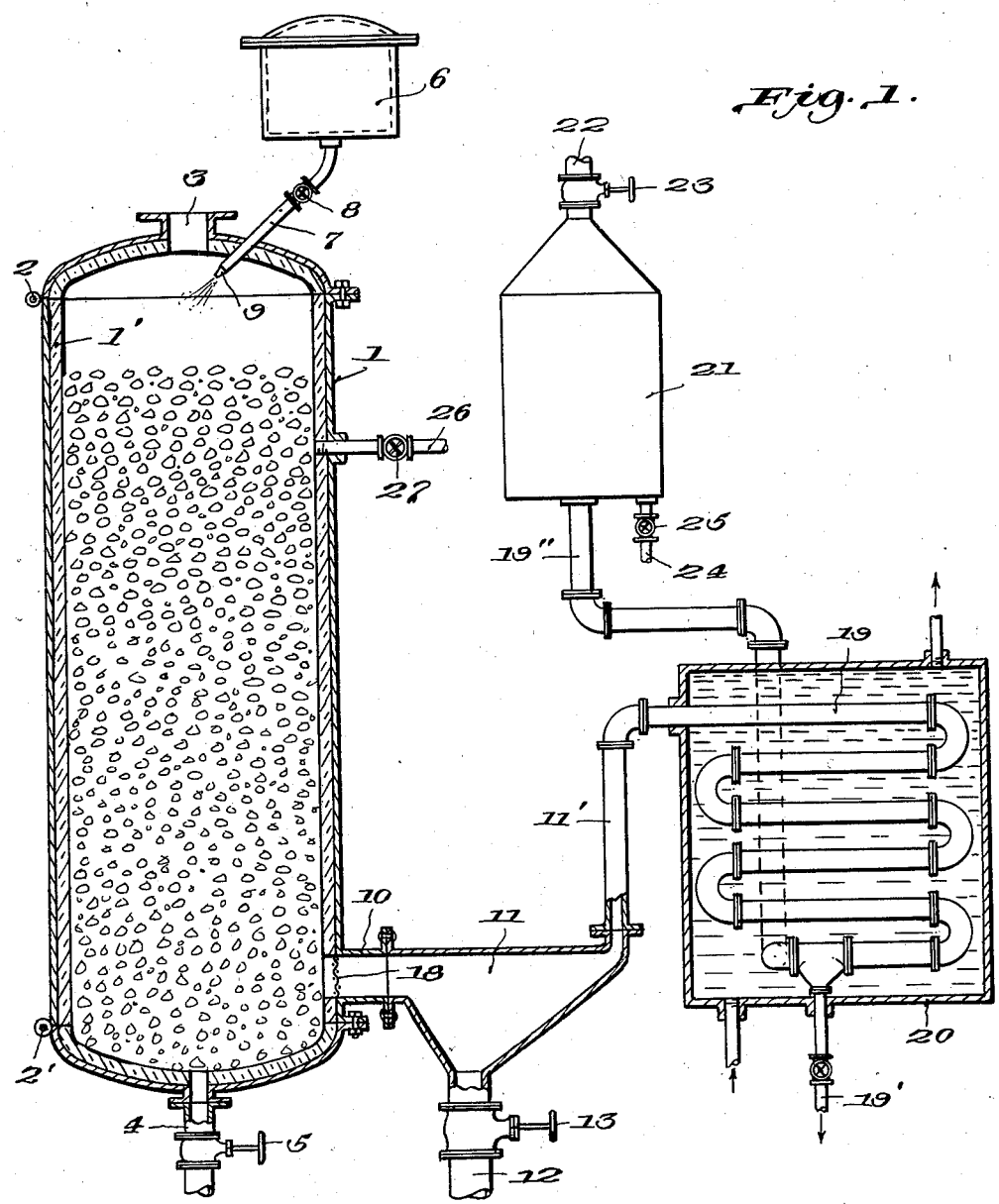

Feb. 4, 1936. R. B. DAY 2,029,757
PROCESS OF IMPROVING HYDROCARBON LIQUIDS
Filed Feb. 21, 1931

Inventor
Roland B. Day
By Stone, Boyden, Mack & Hale
Attorneys.

Patented Feb. 4, 1936

2,029,757

UNITED STATES PATENT OFFICE 2,029,757

PROCESS OF IMPROVING HYDROCARBON LIQUIDS

Roland B. Day, Palos Verdes Estates, Calif., assignor to Universal Oil Products Company, Chicago, Ill., a corporation of South Dakota Application February 21, 1931, Serial No. 517,602

1 Claim. (Cl. 196—36)

This invention relates to a process for treating products of petroleum distillation or pyrogenetic decomposition, as well as natural gasolines, for the purpose of improving the same as to color, odor, doctor test, and other characteristics desirable in a commercial product.

The method as carried out in accordance with this invention is particularly concerned with the elimination of sulphur and gums from gasoline by continuous treatment of the gasoline in the vapor phase with ammonium chloride and solid materials capable of effecting a removal of sulphur and a polymerization of other undesirable constituents whereby these may be readily removed.

It has been more or less common to treat the distilled or cracked vapors from hydrocarbon oils with metallic chloride for the purpose of causing the recombination of the constituents into lighter forms. Many difficulties have attended this kind of process and these have been due in no small degree to the difficulty of handling metallic chloride. It has been discovered that the desulphurization and decolorization of odorous and highly colored gasolines and like cracked products can be better and more readily accomplished by passing gasoline vapors through a mass of metal or other solid material and simultaneously contacting ammonium chloride in suitable form heated at least to its decomposition temperature, and preferably to above 350° F. with the gasoline and metal or other solid material.

In the annexed drawing is shown diagrammatically an apparatus in which the described process may be carried out.

In the accompanying drawing, 1 is a treating chamber containing metal turnings wherein the gasoline is treated in vapor phase. It has a lining 1' of clay or inert plastic or vitreous material which will not react with hydrochloric acid. This chamber is hinged at top and bottom (2 and 2') to permit solid material to be readily introduced and withdrawn. It is also provided with top inlet pipe 3 for gasoline vapor and bottom outlet pipe 4 for withdrawal of liquid, this pipe being controlled by valve 5. 6 represents a closed container for storing ammonium chloride in solution or suspension which may be introduced in the form of a jet into chamber 1 through pipe 7 controlled by valve 8, this pipe being provided with nozzle 9 at its extremity. 10 represents an outlet pipe for treated gasoline vapors, this pipe leading through a trap 11 having a bottom outlet pipe 12 controlled by valve 13. 18 represents suitable filters to confine ammonium chloride formed by the reaction of liberated ammonium hydroxide with liberated hydrochloric acid within the limits of trap 11. 19 represents a condenser coil having water jacket 20 and leading through suitable piping to separator 21 wherein purified and decolorized gasoline condensed in coil 19 is separated from permanent gases which are taken off through pipe 22 controlled by valve 23, the liquid gasoline being removed through pipe 24 controlled by valve 25.

In the operation of the process, gasoline vapors from any suitable source are introduced into chamber 1 through inlet pipe 3. At the same time, ammonium chloride in aqueous solution or non-aqeous suspension is admitted from container 6 to the chamber 1 to flow concurrently with the gasoline vapors. The temperature in chamber 1 is maintained at least at a temperature sufficiently high to decompose ammonium chloride, and preferably above 350° F. by the gasoline vapors. The ammonium chloride under these conditions is decomposed into ammonia and hydrogen chloride. In the chamber 1, through the interaction of gasoline vapors, hydrogen chloride, and metal turnings or other solid material certain beneficial reactions take place, later to be described. As a result of these reactions, the gasoline is decolorized, deodorized, and sweetened and ammonium chloride is continuously decomposed, the liberated hydrogen chloride reacting with the gasoline in the presence of the solid material. Any liquid residual materials formed in chamber 1 collect in the bottom of the chamber and may be withdrawn by opening valve 5. The treated gasoline, in vapor phase, passes through pipe 10, trap 11, and coil 19, where it is condensed through the action of cooling water circulated in jacket 20 and is carried to separator 21 wherein it separates as a liquid and is removed through pipe 24, the permanent gases being drawn off through pipe 22. Any hydrogen chloride set free in the reaction and escaping through pipe 10 is neutralized by ammonium hydroxide solution formed by solution of the liberated ammonia in water. Ammonium chloride is formed as a result of the neutralization and is trapped out in trap 11 where it is confined by filters 18. It is removed periodically through pipe 12 by manipulating valve 13. The introduction of gasoline vapors and ammonium chloride at the top of the chamber 1 may be continuous. The inert lining 1' serves to protect the material of which chamber 1 is composed from contamination by hydrochloric acid set free during the decomposition of the chloride.

The action of the metal turnings appears to be that of a catalyst. Metals whose sulphides are insoluble in hydrochloric acid probably affect the reacting materials differently than those whose sulphides are soluble in hydrochloric acid. In the case of a metal of the former class, copper, for example, it is probable that the following reactions will take place.

At 340° F. the hydrogen chloride produced by decomposition probably dissociates and reacts with the oil:

$$2ROH + 2HCl = 2R + 2H_2O + Cl_2$$
$$RSH + 2H_2O + Cl_2 = R + SO_2 + 2HCl + H$$

(where R represents undesirable hydrocarbon color and odor forming radicles). The nascent hydrogen appears to combine with the oil which may account in some manner for the results obtained. There is not enough oxygen in the oil alone to remove as much sulphur as the copper will extract and for that reason copper sulphide forms unless a little air is used. The same reaction would probably take place also if either cobalt, nickel, gold, silver, or mercury vapor were used, as the sulphides of these metals appear to be insoluble, or difficultly soluble, in hydro-chloric acid. The above reactions would not be likely to take place with metals whose sulphides are soluble in hydrochloric acid, such, for example, as zinc, aluminum, iron, cadmium, or manganese. Instead, a reversible reaction would probably take place evolving hydrogen sulphide in case an excess of ammonium chloride is used, and forming zinc sulphide in case an insufficient amount of ammonium chloride is used.

Although it is not certain whether or not the above chemical reactions definitely take place, the results obtained by using metals of the above types in conjunction with hydrochloric acid have been highly satisfactory.

It is highly desirable to extract the hydrogen sulphide from the gases coming from a cracking plant, as this gas is corrosive and difficult to remove from the gasoline. Its conversion to sulphur dioxide therefore is desired as the sulphuric acid can be readily neutralized at the outlet of the treating chamber, along with the excess hydrochloric acid. Also copper has a much greater affinity for sulphur than some of the other metals, and only with copper, cobalt, nickel, gold, silver, mercury, or other metals whose sulphides are unsoluble or sparingly soluble in hydrochloric acid, can the conversion to sulphur dioxide be made. With other metals, all the sulphur is evolved as hydrogen sulphide. In treating low sulphur gasolines, the reaction with zinc or other metals whose sulphides are soluble in hydrochloric acid would be satisfactory since from the standpoint of color and gum, these metals are entirely satisfactory.

It has also been found that a lowering of the color and gum content of gasolines will take place if the gasoline is contacted with hydrogen chloride over an inert solid substance, such as granite or the like alone, or over certain metallic compounds, such as zinc oxychloride, for example.

It has also been discovered that further reduction of sulphur can be readily obtained by the use of small amounts of sulphuric acid after the vapor phase treatment. Thus, with gasoline having 0.6% sulphur which is reduced to 0.3% by the vapor phase treatment can be further reduced to 0.1% by the use of 2 lbs. of 83% sulphuric acid whereas this low sulphur content cannot be attained by the use of sulphuric acid alone even when as much as 14 lbs. is used. In the combined treatment, 1 lb. of hydrochloric acid would be used to 2 lbs. of sulphuric acid. Some gasolines may require more or less sulphuric acid.

Figure 2:
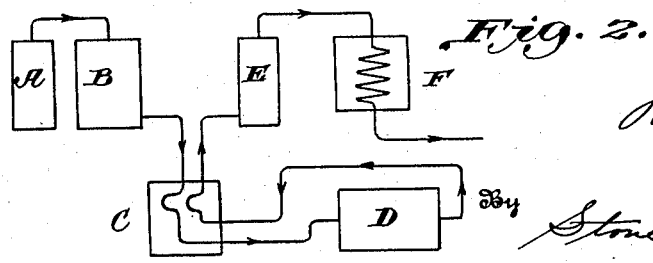

Referring to Figure 2 of the drawing, illustrating a typical flow chart when the combined ammonium chloride and acid treatment is used; A represents the cracking plant dephlegmator or fractionating tower, B the vapor phase treating tower, C heat exchangers, D a continuous sulphuric acid treating plant, E a final fractionating tower, and F a final condenser. In this hookup, the heat contained in the gasoline vapor from the cracking plant would be enough to finish the entire treatment including the redistillation which is necessary after sulphuric acid treatment. In the treatment of low sulphur gasoline, the towers B and E would be directly connected and the elements C and D eliminated.

In further consideration of this treatment, the following facts have become apparent in carrying out the process:

1. The metals which form sulphides that are insoluble in hydrochloric acid are also the metals which react very slightly with hydrochloric acid to form chlorides. In the case of copper, no copper chlorides were detected in the reaction chamber after running a considerable amount of gasoline. Also, very little copper sulphide was formed although the oil was high in sulphur compounds and contained 3.6 mgms. per litre of hydrogen sulphide in solution.

2. All of the hydrogen sulphide is removed by the metal and hydrochloric acid treatment and the mercaptan which gives gasoline a sour reaction with sodium plumbite is removed or changed so that the gasoline is sweet.

3. Hydrogenation of the gasoline takes place, as is evidenced by the increase in gasoline content in the pressure distillate run through the apparatus.

4. Polymerization of unsaturates and nitrogen compounds takes place since the tar produced is a viscous black substance rich in nitrogen compounds and phenols. It must also contain oxygen compounds. It is highly soluble in acetone and alcohol but is insoluble in gasoline and benzol. It is removed from the contact mass by maintaining the velocity high enough to sweep it out.

The amount of hydrochloric acid gas and sulphuric acid needed to treat a barrel of gasoline will vary, of course, depending on the percentage of sulphur and the percentage of unstable hydroxyl radicles in the gasoline. Diolefines are also polymerized and the resultant product has the following characteristics:

Color 30+ Saybolt, after 8 hours sun 25+.
Gum 10 mgms. per litre.
Sulphur reduction from .45 to .20.
Chlorine .01 or less, mgms. per litre.
Doctor test—sweet.
Odor—good.
Anti-knock properties unaffected by treatment (no loss of aromatics or olefines).
Corrosion—negative.

The use of the metal turnings permits the process to run continuously and the contact mass does not need to be changed. The heavy polymers formed are drawn off from the apparatus in liquid state. In contradistinction to this continuous method, in known prior art processes employing metallic halide, the contact mass has become plugged with polymer tars and has had to be dumped and a fresh charge supplied. There has been no provision for continuous regeneration of the reagent.

In actual tests, the above results have been obtained from cracked gasoline which requires fourteen pounds of sulphuric acid 83% per barrel, provided the sulphuric acid treatment alone is used, and the product produced by the present process is better than those products obtained by the sulphuric acid treatment because the color is better and more stable, the gums are lower, no doctor solution is required, and the cost of the required amount of hydrochloric acid is about 1/20 that of the sulphuric. No sludge loss results from the ammonium chloride which means a saving of 2% of the gasoline. The antiknock properties are better also since no olefines or aromatics are combined to form sludge.

It may be desirable, though not positively essential, to provide a filling of inert granular or powdered material in chamber 1, as a depository or backing for the metal turnings. In this way, an economy of metal may be effected while at the same time a large reactive surface is presented. Lumps of granite, pebbles, pumice stone, fuller's earth, kieselguhr and the like are suitable filling materials for this purpose.

The use of ammonium chloride instead of hydrochloric acid, as used according to the invention set forth in my prior application, Serial No. 488,112, filed October 11, 1930, permits the neutralization of excess hydrochloric acid formed without the necessity of adding ammonia water, as the ammonia set free by the decomposition of the ammonium chloride either neutralizes excess hydrochloric acid directly, or, if the ammonium chloride was originally in solution, the ammonia set free forms hydroxide with the moisture and neutralizes the hydrochloric acid. The operation is thus more economical than the hydrochloric acid process in reducing the number of reagents necessary.

As a further embodiment of the present invention, ammonium chloride crystals may be substituted for the metal turnings in chamber 1, and the addition of the ammonium chloride in aqueous suspension omitted in the operation of the process. In the treatment of the gasoline vapors in this fashion, the vapors contact solely with the ammonium chloride crystals in chamber 1, in the absence of a metal. The temperature is kept low, below the decomposition point of ammonium chloride, as it is desired to avoid substantial decomposition of the crystals. By this treatment, it has been found that desulphurization and decolorization can also be readily accomplished.

I claim:—

A process for improving gasoline by removal of sulphur and gum and color-forming constituents which comprises treating gasoline vapors with ammonium chloride in the presence of zinc at a temperature sufficiently high to decompose the ammonium chloride.

ROLAND B. DAY.